US012092739B2

(12) United States Patent
Laurent et al.

(10) Patent No.: US 12,092,739 B2
(45) Date of Patent: Sep. 17, 2024

(54) SENSOR DEVICE WITH HEATED SPOT DETECTION FOR MEASURING MOTION OF VEHICLE AND METHOD OF OPERATING THE SENSOR DEVICE

(71) Applicants: Hyundai Motor Company, Seoul (KR); Kia Corporation, Seoul (KR)

(72) Inventors: Vincent Laurent, Frankfurt Am Main (DE); Timo Schoening, Bonn (DE)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 277 days.

(21) Appl. No.: 17/378,946

(22) Filed: Jul. 19, 2021

(65) Prior Publication Data

US 2022/0357442 A1  Nov. 10, 2022

(30) Foreign Application Priority Data

May 6, 2021 (DE) .......................... 102021204601.0

(51) Int. Cl.
*G01S 17/58* (2006.01)
*G01S 17/06* (2006.01)
(52) U.S. Cl.
CPC .............. *G01S 17/58* (2013.01); *G01S 17/06* (2013.01)

(58) Field of Classification Search
CPC ........ G01S 13/931; G01S 13/60; G01S 13/62; G01S 13/92; G01S 17/58; G01S 17/06; G01P 3/68
See application file for complete search history.

(56) References Cited

U.S. PATENT DOCUMENTS

| | | | |
|---|---|---|---|
| 10,775,175 B1 * | 9/2020 | Bendickson | G01S 17/10 |
| 2005/0087522 A1 * | 4/2005 | Sun | B23K 26/0604 |
| | | | 219/121.61 |
| 2008/0009965 A1 * | 1/2008 | Bruemmer | G06N 3/008 |
| | | | 701/23 |
| 2018/0299556 A1 * | 10/2018 | Marcus | G01S 17/894 |

FOREIGN PATENT DOCUMENTS

| | | | | |
|---|---|---|---|---|
| DE | 3230068 C2 * | 4/1988 | | G01S 17/66 |
| DE | 10 2013 008 953 A1 | 11/2014 | | |
| WO | WO-2018162007 A1 * | 9/2018 | | G01S 17/10 |

\* cited by examiner

*Primary Examiner* — Hwa Andrew Lee
(74) *Attorney, Agent, or Firm* — Fox Rothschild LLP

(57) ABSTRACT

A sensor device for measuring a motion of a vehicle includes a light source for radiating light on a region on a ground below the vehicle in temporal intervals and to produce a spot of increased temperature; a heat detection unit, which is mountable at an underside of the vehicle for detecting a position of the spot on the ground at the temporal intervals; and a control unit for receiving data about a measured time of the spot and the position of the spot from the heat detection unit and to estimate a change of the position of the spot in vehicle coordinates.

9 Claims, 4 Drawing Sheets

SENSOR DEVICE WITH HEATED SPOT DETECTION FOR MEASURING MOTION OF VEHICLE AND METHOD OF OPERATING THE SENSOR DEVICE

CROSS-REFERENCE TO RELATED APPLICATION

This application claims under 35 U.S.C. § 119 the benefit of German Patent Application No. 102021204601.0 filed on May 6, 2021, the entire contents of which are incorporated herein by reference.

BACKGROUND

(a) Technical Field

The present disclosure relates to a sensor device for measuring a motion of a vehicle and a method for operating the sensor device for measuring the motion of the vehicle.

(b) Description of the Related Art

Driver assistance systems (or simply "assistance systems") for vehicle driving performance typically operate by determining vehicle motion parameters based on measurements of wheel rotation or satellite data. For the purpose of operating such assistance systems, it is often necessary to determine the parameters of a motion of a vehicle with high accuracy. Fine-tuning of key stability control systems such as ABS, ESC, and the like requires accurate measurement of a slide slip angle. The slide slip angle usually cannot be directly measured, but instead is calculated from measured values of a longitudinal and a lateral component of a ground velocity of the vehicle. Commonly known systems and measurement methods for the components of the ground velocity are based on either satellite data, such as GPS data logging, or on wheel rotational velocity data determined by a corresponding sensor. Evaluation of GPS data depends on receiving a signal from a satellite. Further, measuring wheel rotation velocity and computing a vehicle velocity depends on wheel rotation without slipping.

German Publication 10 2013 008 953 A1 describes a system having two radar sensors, where the first sensor emits a signal which is detected by the second sensor after being reflected by an object, and at the same time, the second sensor emits a second signal which is detected by the first sensor after being reflected by the object.

SUMMARY

The present disclosure provides an improved sensor device for measuring a motion of a vehicle.

Therefore, the present disclosure provides a sensor device for measuring a motion of a vehicle and a method for operating the sensor device for measuring the motion of the vehicle.

Further embodiments of the present disclosure are subject of the dependent claims and of the following description, referring to the drawings.

According to a first aspect of the disclosure, a sensor device for measuring a motion of a vehicle comprises a light source which is mountable on an underside of the vehicle, wherein the light source is configured to radiate light on a region on a ground below the vehicle in temporal intervals and thereby to produce a spot of increased temperature relative to a surrounding region of the spot on the ground.

Further, the sensor device comprises a heat detection unit, which is mountable at the underside of the vehicle and which is configured to detect a position of the spot on the ground at the temporal intervals; and a control unit which is connected to the heat detection unit and which is configured to receive data about a measured time of the spot and the position of the spot from the heat detection unit and to estimate a change of the position of the spot in vehicle coordinates.

A second aspect of the disclosure provides a method for operating a sensor device for measuring a motion of a vehicle, the method includes providing a sensor device according to the first aspect of the disclosure; setting a counter for light radiation from the light source and temporal measurement at the heat detection unit to zero; radiating light to a spot by the light source and detecting a position of the spot on a ground by the heat detection unit at consecutive moments shifted in time according to a predetermined temporal interval and providing data of the spot position; and processing the data of the spot position by the control unit and estimating a change of the position of the spot in vehicle coordinates.

One of the principles on which the disclosure is based is to provide a more accurate and robust measurement method of crucial motion parameters of the ground velocity components or angles of the motion. The measurement of motion parameters may produce less errors and represents a direct measuring method by sensor data produced at the vehicle itself instead of receiving measurement data from a remote device.

The disclosure therefore can provide exact and reliable measurements for an efficient and optimum fine-tuning of stability control parameters and systems.

The measured data gives direct information about side slip angle $\beta$ and ground velocity components vx and vy instead estimating said values.

Further, a high consistency of measurement can be achieved and the measurement can be performed independently of the testing environment and the driving conditions.

Since the measurement takes place directly at the vehicle, there is a high degree of calibration consistency achievable during the full testing session.

By the completed measurements, the produced data and post-data processing can be used to provide an improved vehicle control at and above a grip limit and provide data when wheels slip or in tunnels where no satellite data is available.

Therefore, the disclosure can be used to improve the accuracy and consistency of the measurement of one or more essential parameters, for example, ground velocity components or the slip angle $\beta$. This results in finding optimum settings while reducing test time.

In the end, safety and driving pleasure can be increased. A live monitoring and displaying of slip angle and velocity components can be performed.

Further, precision, reliability, measuring rate and tunability can be obtained more accurately than in methods of the related art.

The vehicle can be a car, truck, motorcycle, bike or any other vehicle which is able to drive in an arbitrary manner on the ground. The light source can be a pulsed or continuous laser or any other light source which can produce a light spot on the ground and heat the material of the ground within the spot up to a temperature which is significantly higher from the temperature of the surrounding parts of the ground such that the spot can be identified by the heat detection device. Further, a combination of different light sources or more than one light source can be present and used for producing the spot at temporal intervals. The temporal intervals for radiating the light to the ground (e.g., soil) can correspond to a time sequence with constant or varying time sections and moments at which light is radiated to the ground. The spot can be of a diameter of 1-10 mm or even up to cm scales. The ground can be asphalt, rocks, sand, mud or any other typical surface on which a vehicle is driven. A frequency of radiating light which corresponds to the temporal intervals of radiation can be in range of hundreds of Hz, for example, 200 Hz. The heat detection unit can be any detector which is able to detect heat from a spot or an increased temperature of a spot at typical distances below the vehicle and between the underside of the vehicle and the ground, for example, over a range of few cm or up to one meter or even more. The control unit can be part of the sensor device or remote to it. The spot position can be measured and compared to previous positions and from this data it can be estimated how the vehicle has moved and how it will further move, regarding velocity and direction of motion. The position of the spot can be identified relative to the dimensions of the vehicle and or the basic directions which span up the vehicle coordinates.

Setting the counter means that a motion of the vehicle regarding velocity and position can be measured and evaluated starting from the moment when the counter is set to zero.

According to some embodiments, the light source may be configured to radiate the light to the spot at a first moment and at a second moment which may be shifted in time, wherein a direction of radiating the light to the spot from the vehicle being constant with regard to the vehicle.

The two moments may represent a time interval (moments at the beginning and end of the interval) within a series of temporally shifted moments at which a light radiation to spots can be performed. At these two particular moments two consecutive positions of the vehicle and of the spot can be measured and from the time span between the two moments it is possible to compute the changes in position, the angle of motion, the velocity and similar parameters. The light source(s) and the heat detection unit are mounted at fixed positions and angles at the vehicle and towards the ground such that the spot is radiated always in a constant direction relative to the vehicle and the field of view of the heat detection unit is also always the same when viewed relative to the vehicle.

According to some embodiments, the control unit may be configured to calculate a side slip angle or a speed vector of the vehicle from two consecutively measured spots at different times and compare it to a previous state.

According to some embodiments, the light source may be a pulsed laser.

A creation of the spots as markers on the ground can be applied at a fast rate relatively to the motion of the vehicle. Such a light source can be a pulsed laser and operated at a fast frequency, for example, at 200 Hz.

Depending on the speed of the motion of the vehicle the parameters of the light source to produce the spot can be adequately adapted in order to achieve spots at rates which can be measured by a corresponding diagnostic such as the heat detection unit. Therefore, the laser properties such as wavelength, energy density, pulse duration and other can be adequately set in order to be able to significantly heat up the ground, for example, the asphalt, to a temperature which can be quickly and precisely detected by the heat detection unit, for example, a temperature above 20 degrees Celsius. The spot can be provided in a focused area with diameter of about 1 cm, for example, without damaging the ground. The corresponding method for analyzing the vehicle motion by the spot can be based on creating the spots as markers at consecutive temporal moments (intervals), provide a data acquisition and data-post processing afterwards from the measured spot positions relative to the previous state defined by the vehicle data (angle, velocity) at the previously known position.

The heat detection unit can be a high-speed heat detection unit, for example, an infrared camera, which can be configured to take pictures of the ground at same rate as the laser pulses are radiated. Therefore, a fast frame rate of the measured images, for example, at 200 fps, can be applied. Further, a small integration time of 1 ms to 5 ms, for example, can be used in order to ensure sharp images of the spots.

For such a high frame rate, a field of view of the heat detection unit can be suitable in order to provide spot measurements up to a vehicle motion of 250 km/h.

In order to keep the motion data available it is possible that the spot measurements, for example, the images, are saved on a high storage capacity external hard disk for further post-processing.

In principle, a bespoke image spot tracking program can be applied and used which measures the position difference of consecutively detected spots in coordinates of the plane of the ground, for example, the X and Y components (positions) of the spot, for example, in vehicle coordinates.

The times of measuring the spot position and the time intervals between can be known. Further the time interval between two laser pulses can be known, for example, 5 ms, wherein the spots are measured at the moments of consecutive active pulses. Therefrom the velocity components in the ground plane XY can be easily computed as vx and vy. Further, the side slip angle $\beta$ can also be computed from said measurements at the consecutive pulses.

By repeating these operations and measurements, for example, at a rate of 200 times/sec and over a whole test time, it is possible to receive and acquire a very significant amount of test data for the vehicle motion. Said data can be used for an optimum tuning of stability control systems.

According to some embodiments, the laser may have a pulse rate of 200 Hz.

According to some embodiments, the heat detection unit may comprise a thermal camera, having a constant field of view relative to the vehicle.

The heat detection unit can also have more than one heat sensor. The heat detection unit can comprise an infrared sensor or camera.

The determination of the motion parameters can be thus based on the analysis of the difference in position of two spots as two heat markers, wherein said spots as heat markers can be created on ground below the vehicle, for example, by a laser at a high pulse rate. The pulse rate can be for example, 200 Hz, also less or higher.

The positions of the spots as heat markers can be measured over consecutive time intervals by the heat detection unit, for example, the positions can be captured by a thermal camera, whose pictures are post-processed by a bespoke image analysis program to calculate the desired values of the velocities of the vehicle over ground vx, vy. It has to be pointed out that such a measurement is more accurate because it is a direct method what means that the measurement focuses on an actual motion output of the vehicle (e.g. position of car relatively to ground in XY plane).

According to some embodiments, the heat detection unit may be configured to record the position of the spot at the same temporal intervals as the light of the light source is radiated to the spot.

It is possible to identify the spot at approximately the same moment as it is produced, or shortly after the radiation so as to let the ground heat up at the spot. The shift between radiation and detection can be based on a predetermined time value. It is also possible that a sensor, for example, a camera, can detect the material of the ground (e.g., soil) and adjust the frequency of light radiation and the frequency of detection of the heat detection unit or the temporal shift between radiation and detection in order to consider the heat transfer in the particular material of the ground.

According to some embodiments, the sensor device may comprise a storage device to which data from the heat detection unit may be saved and where the control unit is connected to the storage device and configured to post-process the data stored in the storage device over time.

The evaluation of the measured spot positions due to their changes in time can lead to information about motion angles and velocity components and is a kind of post data processing.

According to some embodiments, the control unit may calculate a side slip angle (beta) or a speed vector of the vehicle from two consecutively measured spots at different times and compare it to a previous state.

The method can be subject to similar advantages and properties as already mentioned in conjunction with the sensor device.

BRIEF DESCRIPTION OF THE DRAWINGS

For a more complete understanding of the present disclosure and advantages thereof, reference is made to the following description taken in conjunction with the accompanying drawings. The disclosure is explained in more detail below using exemplary embodiments, which are specified in the schematic figures, in which.

Unless indicated otherwise, like reference signs to the figures indicate like elements.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example, both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
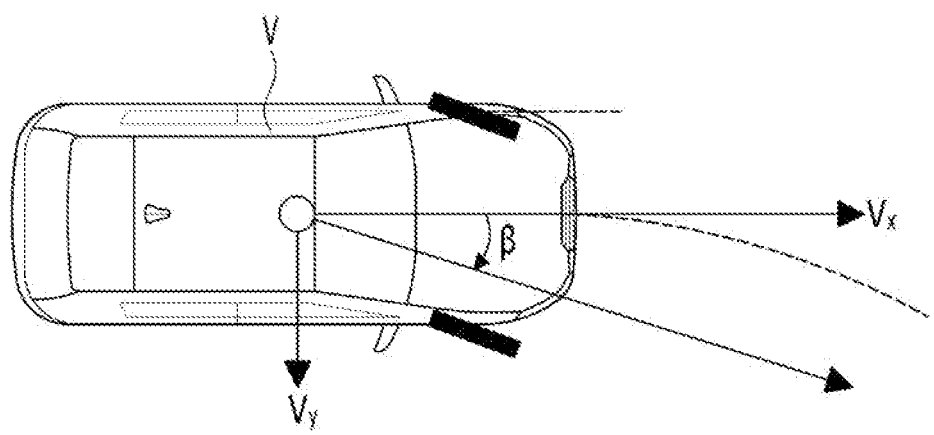
FIG. 1 shows a view of a vehicle defining velocity components and a side slip angle according to an embodiment of the disclosure.

FIG. 1 exemplarily shows a view on a vehicle defining velocity components and a side slip angle according to an embodiment of the disclosure.

FIG. 1 shows a top view of the vehicle V and a possible motion. The wheels of the vehicle can be positioned at a particular steering angle which can result in a side slip angle, which can represent a change in the direction of an initial motion after the beginning of a measurement. From the measured data it can be possible to conduct a post-processing and a side slip angle β and ground velocity components vx and vy can be estimated. These values can be delivered to assistance systems in the vehicle.

Figure 2:
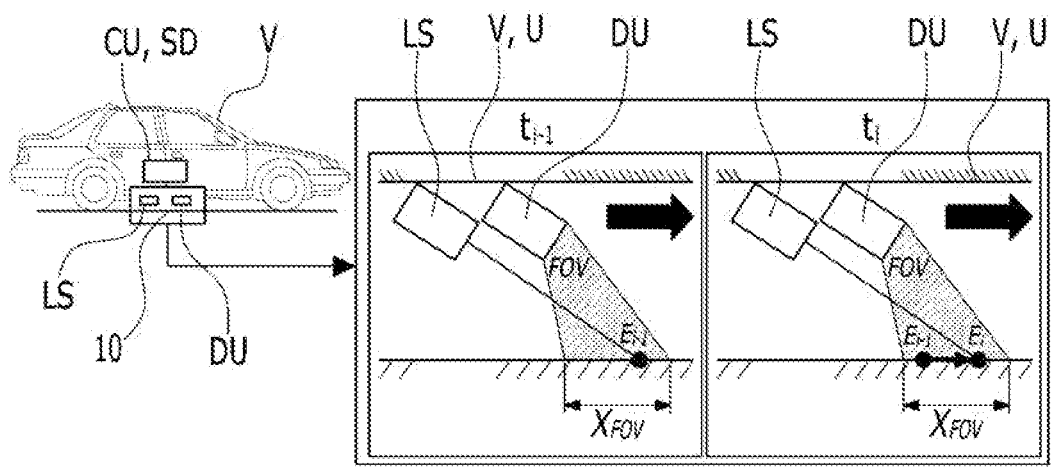
FIG. 2 shows a sensor device for monitoring a spot on the ground for detection of the motion of the vehicle according to an embodiment of the disclosure.

FIG. 2 exemplarily shows a sensor device for monitoring a spot on the ground for detection of the motion of the vehicle according to an embodiment of the disclosure.

The sensor device 10 for measuring a motion of a vehicle V comprises a light source LS which is mounted on an underside U of the vehicle V, and wherein the light source LS is configured to radiate light on a region on a ground (e.g., soil) below the vehicle in temporal intervals and to produce a spot of increased temperature relative to a surrounding region of the spot on the ground; a heat detection unit DU, which is mountable at the underside of the vehicle and which is configured to detect the position of the spot on the ground at temporal intervals; and a control unit CU which is connected to the heat detection unit DU and which is configured to receive data about the measured time of the spot and the position of the spot from the heat detection unit and to estimate a change of the position of the spot in vehicle coordinates. The light source can be mounted close to the heat detection unit, for example, directly adjacent to it laterally at the underside of the vehicle. The field of view FOV of the heat detection unit DU can stay constant and have an extend XFOv in one or both of the planar coordinates of the ground in vehicle coordinates. The XFOv can be large enough such that at the given rate of spot radiation, for example, at 200 Hz, at least two consecutively produced spots Ei−1 and Ei can be within the field of view FOV in this extend, having a distance Di between them.

The control unit CU can be configured to calculate a side slip angle and a speed vector (vx, vy) of the vehicle from two consecutively measured spots Ei−1 and Ei at two consecutive moments in time ti−1 and ti. The position of the spot Ei is compared relative to the vehicle and to the position of the spot at the previous time moment ti−1 and compare it to a previous state at ti−1. The light source LS is configured to radiate the light to the spot at a first moment ti−1 and at a second moment ti which are shifted in time, wherein a direction of radiating the light to the spot from the vehicle is constant with regard to the vehicle. The light source can be a pulsed laser, for example, having a frequency of producing a spot of 200 Hz. The heat detection unit DU may comprise a thermal camera, having a constant field of view relative to the vehicle V.

The sensor device 10 may comprise a storage device SD, which can be mounted in or at the vehicle or remote to it and to which data from the heat detection unit DU may be saved and wherein the control unit CU can be connected to the storage device SD and configured to post-process the data stored in the storage device SD over time.

Figure 3:
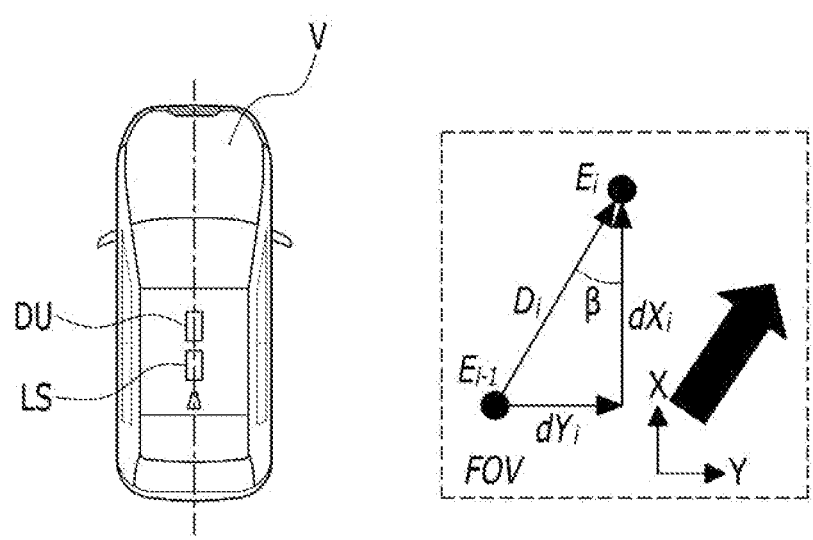
FIG. 3 shows a relation between measured spot positions and the motion parameters of the vehicle.

FIG. 3 exemplarily shows a relation between measured spot positions and the motion parameters of the vehicle.

The motion parameters for the vehicle V are shown in a side view in FIG. 2 and in a top view in FIG. 3. The spot can be produced on the ground at two consecutive times ti−1 and ti producing the corresponding spots Ei−1 and Ei which can be within the measured field of view FOV at the applied frequency of radiation and measurement. The second spot Ei can be a total distance Di away from the position of the previous spot Ei−1. The total distance can be split into deviations in vehicle coordinates dXi and dYi which have the side slip angle β between them.

The principle of consecutive time moments can be used also for further moments as t1=t0+1/f, f being the pulse frequency. Therefore, the measurement of the spot position can be repeated N−1 more times until end of test with N pictures of current and previous vehicle positions. In this sense the side slip angle at the pair of moments is βi=tan−1(dYi/dXi).

For each of the N pictures taken by the heat detection device coordinates of Ei−1 and Ei can be measured in vehicle reference frame and then components of relative displacement can be calculated dXi=Xi−Xi−1 and dYi=Yi−Yi−1.

The vehicle can have an initial reference position at ti−1 and an already changed position and orientation at ti.

Every particular position can be expressed in the corresponding coordinates (vehicle coordinates), for example, Ei=(Xi, Yi) and Ei−1=(Xi−1, Yi−1) wherein Di=(Xi−Xi−1, Yi−Yi−1). For each change in position the particular side slip angle can be calculated.

A counter for data measurement and post processing can be set to zero, in other words start at a first moment. This corresponds to resetting a calculation loop for tracking several positions.

A loop for measurements and post data processing can be completed as follows.

At $t_{i+1}$=i×0.005 s, a picture of the spot can be imported to the control unit. The picture of the ground with the two chronogically successive heated spots (markers) in the frame is taken or imported.

Further, it is possible therefrom to detect and uniquely label both markers as $E_i$ at $t_i$ and $E_{i+1}$ at $t_{i+1}$.

Both markers can be geometrically identified and tagged with a unique label. An identification can be based on a characterization of a heat contour with a specific threshold value of the spot, thereby labelling is linked to the time step when the marker is detected on the ground.

Further, X and Y coordinates for $E_i$ and $E_{i+1}$ can be measured, the coordinates of the center of each marker can be measured on the image in both dimensions X and Y.

Further, it is possible to calculate β for marker $E_i$ and the angle between both markers can be calculated by formula $\beta = \tan^{-1}(Y/X)$.

The resulting positions, angle, velocity components can be stored in the storage, for example, as rows in a table.

Each value can be stored in an exportable file format sorted by time. The values can be used for online processing or later for data analysis.

An increment i by 1 can be completed and the counter can be increased by 1, being a step to move on to the next image.

If there is already any further picture detected at the loop can return to the step of import a picture at ti+1. If there is no new picture detected, then the post processing can be stopped. Otherwise the loop starts again for the next time step.

Figure 4:
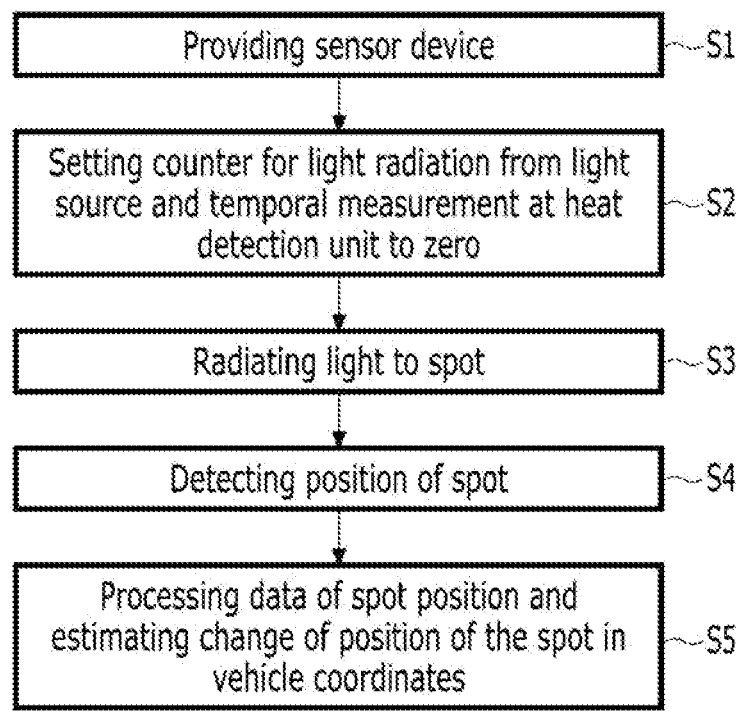
FIG. 4 shows a flowchart of a method according to an embodiment of the disclosure.

FIG. 4 exemplarily shows a flowchart of a method according to an embodiment of the disclosure.

The method for operating a sensor device for measuring a motion of a vehicle comprises the step of providing S1 a sensor device according to the first aspect of the disclosure. The method further comprises the step of setting S2 a counter for light radiation from the light source and temporal measurement at the heat detection unit to zero; radiating light S3 to a spot by the light source and detecting S4 a position of the spot on a ground by the heat detection unit at consecutive moments shifted in time according to a predetermined temporal interval and providing data of the spot position. The method further comprises the step of processing S5 the data of the spot position by the control unit and estimate a change of the position of the spot in vehicle coordinates.

The disclosure has been described in detail referring to exemplary embodiments. However, it will be appreciated by those of ordinary skill in the art that modifications to these embodiments may be made without deviating from the principles and central ideas of the disclosure, the scope of the disclosure defined in the claims, and equivalents thereto.

What is claimed is:

1. A sensor device for measuring a motion of a vehicle, comprising:
    a light source which is mounted on an underside of the vehicle, wherein the light source is configured to radiate light on a region on a ground below the vehicle in temporal intervals and thereby to produce a spot of increased temperature relative to a surrounding region of the spot on the ground;
    a heat detection unit, which is mounted at the underside of the vehicle and which is configured to detect a position of the spot on the ground at the temporal intervals such that the heat detection unit detects the position of the spot on the ground at a same rate as the light source produces the spot; and a control unit which is connected to the heat detection unit and which is configured to receive data about a measured time of the spot and the position of the spot from the heat detection unit and to estimate a change of the position of the spot in vehicle coordinates, wherein the light source is configured to radiate the light to the spot at a first moment and at a second moment which are shifted in time, wherein a direction of radiating the light from the vehicle is constant with regard to the vehicle, and wherein the heat detection unit has a constant field of view relative to the vehicle.

2. The sensor device according to claim 1, wherein the control unit is configured to calculate a side slip angle or a speed vector of the vehicle from two consecutively measured spots at different times and compare it to a previous state.

3. The sensor device according to claim 1, wherein the light source is a pulsed laser.

4. The sensor device according to claim 3, wherein the laser has a pulse rate of 200 Hz.

5. The sensor device according to claim 1, wherein the heat detection unit comprises a thermal camera.

6. The sensor device according to claim 1, wherein the heat detection unit is configured to record the position of the spot at the temporal intervals at which the light of the light source is radiated to the spot.

7. The sensor device according to claim 1, wherein the sensor device comprises a storage device to which data from the heat detection unit is saved and wherein the control unit is connected to the storage device and configured to post-process the data stored in the storage device over time.

8. A method for operating a sensor device for measuring a motion of a vehicle, comprising the steps of:

providing a sensor device, the sensor device comprising:
  a light source which is mounted on an underside of the vehicle, wherein the light source is configured to radiate light on a region on a ground below the vehicle to produce a spot of increased temperature relative to a surrounding region of the spot on the ground, and a direction of radiating the light from the vehicle is constant with regard to the vehicle;
  a heat detection unit, which is mounted at the underside of the vehicle and configured to detect a position of the spot on the ground, wherein the heat detection unit has a constant field of view relative to the vehicle such that the heat detection unit detects the position of the spot on the ground at a same rate as the light source produces the spot; and
  a control unit which is connected to the heat detection unit and which is configured to receive data about a measured time of the spot and the position of the spot from the heat detection unit and to estimate a change of the position of the spot in vehicle coordinates;

radiating light to the spot by the light source and detecting the position of the spot on the ground by the heat detection unit at consecutive moments shifted in time according to a predetermined temporal interval and providing data of the spot position;

processing the data of the spot position by the control unit and estimate the change of the position of the spot in the vehicle coordinates.

9. The method according to claim 8, wherein the control unit calculates a side slip angle or a speed vector of the vehicle from two consecutively measured spots at different times and compares it to a previous state.

* * * * *